May 21, 1968 J. A. CUPLER II 3,384,308
COMPOSITE FLUID NOZZLE HAVING ITS VARIOUS SECTIONS
JOINED TOGETHER BY AN AUTOGENOUS BEAM WELD
Filed Nov. 22, 1965 2 Sheets-Sheet 1

INVENTOR
JOHN A. CUPLER, II.
BY *Raymond Wootten*
ATTORNEY

INVENTOR
JOHN A. CUPLER, II
BY Raymond W Cotten
ATTORNEY 3,384,308
COMPOSITE FLUID NOZZLE HAVING ITS VARIOUS SECTIONS JOINED TOGETHER BY AN AUTOGENOUS BEAM WELD
John A. Cupler II, 10 Cupler Drive,
La Vale, Md. 21502
Filed Nov. 22, 1965, Ser. No. 508,936
19 Claims. (Cl. 239—600)

ABSTRACT OF THE DISCLOSURE

The disclosure is directed to fluid nozzles that consist of a plurality of component parts which are joined together by an autogenous beam weld. The weld so formed does not adversely affect the physical properties of the component materials and is so controlled as to depth of penetration as to terminate short of the inner passages formed within the nozzles. The disclosure further describes a plurality of mating component configurations from which the nozzles may be fabricated.

---

This invention relates to composite fluid nozzles and is applicable to newly manufactured nozzles and to rebuilt nozzles.

A particularly important application of the present invention is in conjunction with Diesel engine nozzles, but it is also applicable to other types of fuel nozzles, spinnerettes, and nozzles generally.

It has been conventional in the past to construct the body of a Diesel nozzle and its discharge tip in integral form, rendering it exceedingly difficult, if not impossible, to achieve the desired concentricity of the inner bore of the tip with its periphery so as to assure uniformity in length of the discharge passages formed through the tip. Moreover, it has been difficult to avoid the formation of burrs at the upstream ends of the discharge passages, and where such burrs are formed, it is extremely difficult to remove them.

Many thousands of Diesel nozzles are discarded each year, primarily because of damage received to the discharge tip in an operating engine. When these nozzles are discarded, it is usual to discard them as an entirety, which means in many cases, relatively expensive valves and other components, still in operative condition, are discarded as well.

By producing nozzle bodies and their discharge tips separately, and then securing them together by beam welding involving electron beam and laser techniques, according to the present invention, it is possible to obtain the desired concentricity, uniformity in length and diameter of the discharge passages, accessibility to the upstream ends of the discharge passages for contouring and removal of burrs, identity in configuration and characteristics of completed nozzles, and economy by suitably removing and replacing only the worn or damaged discharge tip when the nozzle would otherwise be discarded as an entirety. Moreover, inasmuch as the selection of materials in the production of nozzles has always been a compromise between the retention of workability and machining on the one hand and the provision of the best characteristics for the various areas of the nozzles on the other, the present invention contemplates the use of the best materials to serve the requirements of the different nozzle areas, assuring a longer useful life of the nozzle and economy in its production.

It is among the objects of the present invention to provide a composite fluid nozzle comprising a body member containing a passage having inlet and discharge ends, a seat on the body member, and a discharge tip member, the tip member having a surface engaging the seat and being beam welded to the body member in fluid tight relationship, the tip member containing a fluid discharge passage of smaller cross section than and communicating with the body member passage. The discharge tip member preferably has an inner bore and an outer periphery in concentric relationship. By the utilization of beam welding, the deep penetration and strong bond required for nozzles of the types contemplated by this invention are achieved. The beam welding is also important in producing the required bond without adversely affecting the physical characteristics of the metals joined thereby. The following named inherent characteristics of a beam weld make possible the fabrication of a satisfactory nozzle:

(1) An autogenous weld which fuses the component parts;
(2) Extremely accurate weld depth control;
(3) Minimal heat migration; and
(4) Extremely accurate weld width control.

The discharge tip member and body member preferably have beam welded transverse and peripheral walls in mutual contact respectively, and the tip may be recessed in a cavity formed in the body member with the seat in spaced relationship with respect to the discharge end of the body member passage.

The tip member may contain a plurality of fluid discharge passages, in which cases they will preferably be of equal length and diameter and each will be of smaller cross section than and communicating with the body member passage. The body member itself may be formed from a plurality of parts beam welded together.

The fluid discharge passages preferably include cylindrical terminal wall portions and they may include portions converging from the body member passage to the terminal wall portions for purposes of transition. The body member and discharge tip member preferably have bores in registry and coaxial peripheries. The discharge tip member preferably has an annular wall portion of uniform thickness containing a plurality of fluid discharge passages of smaller cross section than and communicating with the body member passage. The seat provided by the body member and the surface of the discharge tip member engaging it are preferably complementary and annular, and in the case of certain types of nozzles contemplated by the present invention, such as Diesel nozzles, the discharge tip member preferably projects beyond the body member. The body member and discharge tip member may be dissimilar in composition whereby the discharge tip member may differ from the body member in hardness, toughness, wear resistance, corrosion resistance, and/or abrasion resistance and be formed independently therefrom before assembly.

A more complete understanding of the invention will follow from a description of the accompanying drawings wherein.

Figure 1:
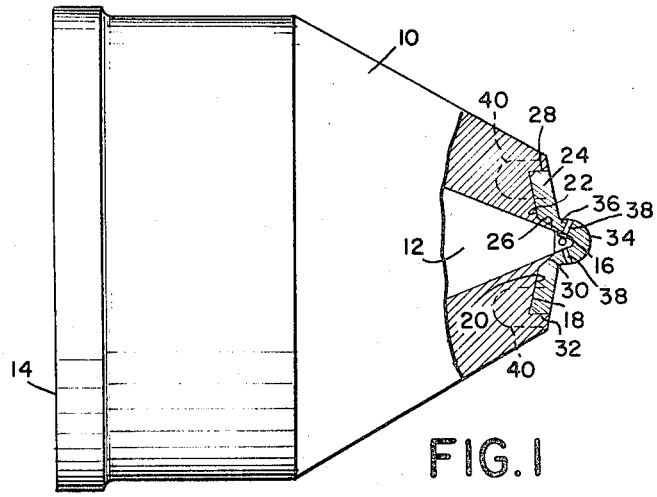
FIG. 1 is an elevation, partially in section, depicting a Diesel nozzle embodying the present invention.

The Diesel nozzle depicted in FIG. 1 including a body member 10 containing a passage 12 extending from its inlet end 14 to its discharge end 16, and containing a recess 18 defined by a shoulder 20 extending transversely of the body member which provides a seat for a substantially complementary transversely extending surface 22 formed on the upstream portion of a discharge tip member 24. The recess 18 is of annular configuration, extending between an inner peripheral wall 26 and an outer peripheral wall 28. The discharge tip member is formed with an inner peripheral surface 30 substantially complementing the inner peripheral wall 26 and an outer peripheral surface 32 substantially complementing the outer peripheral wall 28 of the body member. Projecting forwardly of the body member 10, the discharge tip member is provided with a tip 34 having an annular wall portion 36 of uniform thickness containing discharge passages 38 of substantially equal length and diameter, each having a cross section smaller than that of the passage 12.

Inasmuch as the discharge tip member 24 is formed separately from the body member, any burrs formed at the intersection of the discharge passages 38 with the upstream surface of the discharge tip member will be much more readily accessible for removal than in the case of conventionally constructed unitary nozzles. Moreover, this composite construction lends itself to production of the discharge tip members by impact or pressure forming, hot or cold, assuring great uniformity and providing maximum economy. Where any configuration of a discharge tip member does not lend itself to such forming, then of course, it can be machined. After the discharge tip member 24 has been formed, it can be temporarily inserted in the body member for which it is ultimately intended, or in a holder dimensionally identical with the body member for which it is intended, whereupon the drilling operation will be performed, following which the discharge tip member can be removed from the body for such heat hardening as may be desired, such as in a vacuum or an inert atmosphere and then any necessary deburring can be effected. Subsequently, the discharge tip member can be restored to the same relative position in the body member that it assumed during drilling and the bonding operation will follow. Electron beam welding has been found to be particularly effective in conjunction with this invention, and such a deep annular weld 40 has been depicted in broken lines in FIG. 1.

It is contemplated that during the drilling of the discharge passages 38, the discharge tip member be supported in a fixture containing holes in registry with those to be drilled whereby, when the drill breaks through the wall of the discharge tip member, it will enter a registering opening in the fixture and thereby avoid the formation of a burr.

Figure 2:
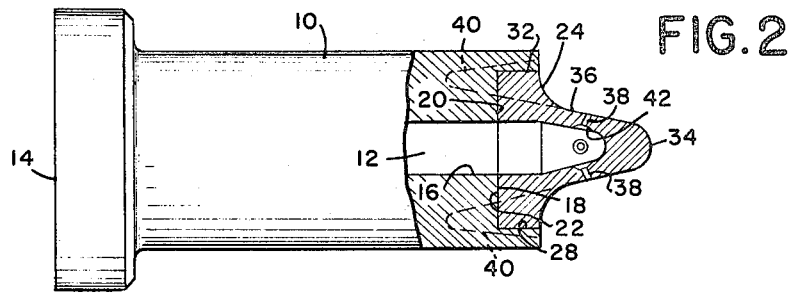
FIG. 2 is an elevation, partially in section, depicting another form of Diesel nozzle embodying the present invention.

Another form of Diesel nozzle has been depicted in FIG. 2, to which reference characters corresponding with those applied to FIG. 1 have been employed insofar as feasible. In this case, there is no inner peripheral wall 26 nor an inner peripheral surface 30 corresponding with those of FIG. 1. The outer peripheral wall 28 and the outer peripheral surface 32 extend substantially parallel with the axis of the passage 12 formed in the body member 10 and the shoulder 20 and transversely extending surface 22 are depicted as substantially perpendicular to the axis of the passage 12 of the body member. Here again, the annular wall portion 36 is of substantially uniform thickness so that the lengths of the discharge passages 38 will be equal. The diameters of the discharge passages 38 will likewise be equal so that each discharge tip member for a given type of nozzle will be identical with the others to assure optimum performance of an engine utilizing nozzles embodying the present invention.

In the discharge tip member 24 of FIG. 2, a transition passage 42 is formed at the upstream end of each discharge passage 38 to improve the flow characteristics of the liquid delivered from the passage 12 of the body member to the discharge passages 38 of the tip member. Here again, an annular and deep weld 40 is produced, preferably by a procedure that will eliminate the introduction of foreign materials and assure a strong bond.

Figure 3:
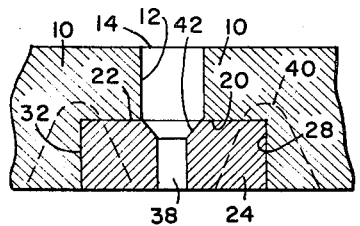
FIG. 3 is a fragmentary sectional elevation of another type of nozzle embodying the invention.

In the nozzle construction depicted in FIG. 3, the discharge tip member does not extend beyond the body member 10. The shoulder 20 is substantially perpendicular to the axis of the passage 12 formed in the body member and a transition passage 42 is formed in the discharge tip member, extending from the passage 12 to the cylindrical portion of the discharge passage 38. Here again, a deep weld of the type produced by electron beam welding has been indicated by the reference character 40.

Figure 4:
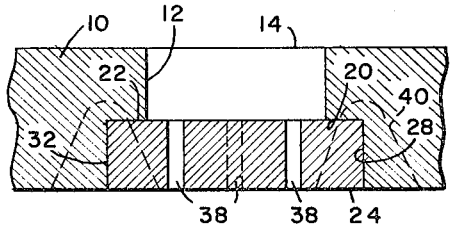
FIG. 4 is a sectional elevation of still another form of nozzle embodying the invention.

The nozzle depicted in FIG. 4 differs primarily from that of FIG. 3 in the provision of a plurality of discharge passages 38, lacking transition passages of the type shown in FIGS. 2 and 3.

Body members for composite nozzles contemplated by the present invention can be made from tubing which can be machined, cold headed, or hot formed in dies. Whereas the discharge tip members can be formed of materials identical with those employed in forming the body members, as previously set forth, the materials can be different so that the discharge tip members can withstand the conditions to which they are subjected in operation for long periods of time, while the body members can be formed of materials which are more easily worked and which will be adequate for the conditions which they must withstand. The nozzles or any portions thereof can be coated to render them resistant to corrosion and erosion, where desired.

Figure 5:
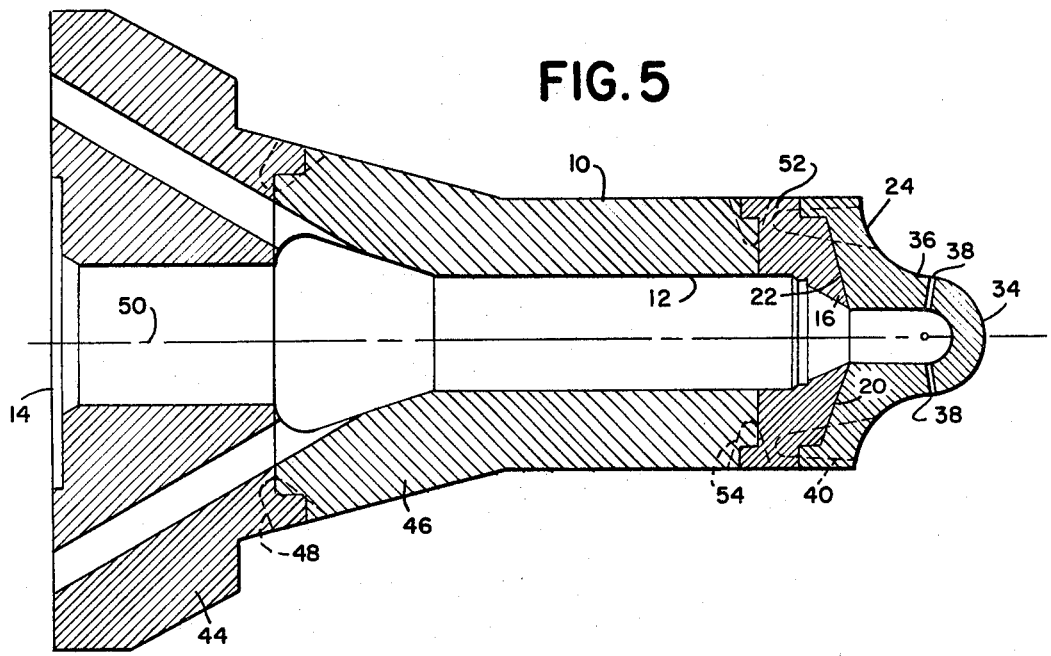
FIG. 5 is a sectional elevation of a Diesel nozzle composed of several parts beam welded together.

The body member 10 of FIG. 5 is composed of a base member 44 bonded to a shank member 46 by a beam weld 48 disposed at an acute angle to the axis 50 of the body member, and a discharge end member 52 bonded to the shank member 46 by a beam weld 54 disposed at a right angle to the axis 50. The discharge tip member 24 is in turn bonded to the discharge end member 52 by the beam weld 40 directed parallel to the axis 50. It will follow that multiple parts can be employed with beam welds oriented in a variety of directions. By forming such nozzles from several parts, each may be formed separately with great accuracy and minimum forming difficulty. Since the inner bore of the discharge tip member is short, as in each of the embodiments depicted, there is no danger of the "run out" that occurs so frequently in the drilling of long passages. Hence the desired concentricity of inner bore and outer periphery is facilitated.

Figure 6:
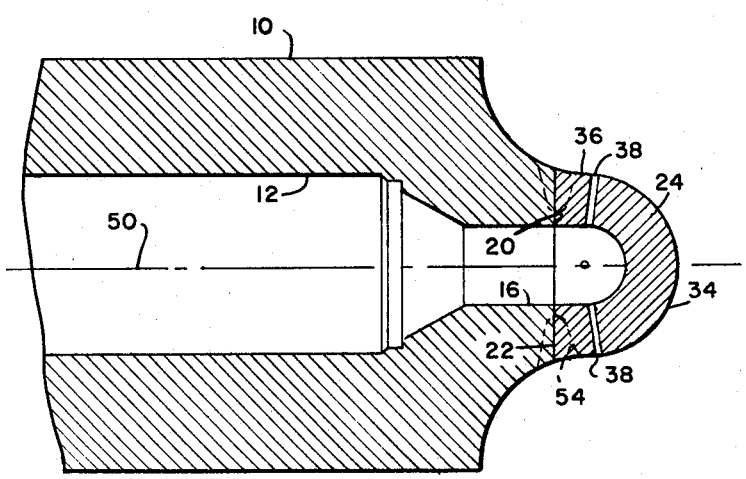
FIG. 6 is a fragmentary sectional elevation of a Diesel nozzle depicting another variation.

In FIG. 6 the seat 20 is formed at the discharge end of the body member 10, transversely of the axis 50. The complementary surface 22 of the discharge tip member is likewise disposed transversely of the axis 50 in contact with the seat 20 and bonded thereto by a beam weld 54. Inasmuch as there is no cavity in the body member in this case for reception of the tip member, the parts are held in abutting registry during the beam welding operation by suitable tooling.

When a discharge tip member becomes worn or damaged, it can be severed from the body member by machining, beam cutting, or otherwise, and a new discharge tip substituted and beam welded in position, assuring an added life to the nozzle at least as great as its initial period of service.

Since the physical characteristics of a number of ceramic materials and sintered metals render them highly desirable for use as the discharge tips or other portions of many types of nozzles, and since beam welding can be utilized to bond these ceramic and sintered materials to one another as well as to metals, the present invention contemplates such materials as composing the discharge tip members 24 and/or any desired portions of the nozzle bodies.

Nozzles embodying the present invention are capable of withstanding high pressures and corrosive influences for long periods of time, and in fact, nozzles rebuilt in accordance with this invention will have a longer useful

I claim:

1. A composite fluid nozzle having an outer surface and fluid passage means extending therethrough wherein the component parts thereof are joined together by a weld which does not adversely affect the physical characteristics of the materials joined thereby, comprising; a body member containing a passage having inlet and discharge ends, a seat on said body member, a discharge tip member, at least one of said members consisting of a material whose physical characteristics are adversely affected by substantial weld width and heat migration, said tip member having a surface engaging said seat, means autogenously fusing said members together in fluid tight relationship at the juncture thereof, said means consisting essentially of a beam weld extending into said composite fluid nozzle from said outer surface and terminating short of said fluid passage means, and said fluid passage means including a fluid discharge passage formed in said tip member of smaller cross section than and communicating with said body member passage.

2. A composite fluid nozzle according to claim 1 wherein said discharge tip member has an inner bore and an outer periphery in concentric relationship.

3. A composite fluid nozzle according to claim 1 wherein said body member contains a cavity and said discharge tip member is received in said cavity.

4. A composite fluid nozzle according to claim 1 wherein said discharge tip member and said body member have beam welded transverse and peripheral walls in mutual contact respectively.

5. A composite fluid nozzle according to claim 1 wherein said seat is recessed in said body member in spaced relationship with respect to said discharge end.

6. A composite fluid nozzle according to claim 1 wherein said tip member contains a plurality of fluid discharge passages of equal length and diameter, each of smaller cross section than and communicating with said body member passage.

7. A composite fluid nozzle according to claim 1 wherein said fluid discharge passage includes a substantially cylindrical terminal wall portion and a portion converging from said body member passage to said terminal wall portion.

8. A composite fluid nozzle according to claim 1 wherein said body member and discharge tip member have coaxial peripheries.

9. A composite fluid nozzle according to claim 1 wherein said discharge tip member has an annular wall portion of uniform thickness containing a plurality of fluid discharge passages of smaller cross section than and communicating with said body member passage.

10. A composite fluid nozzle according to claim 1 wherein said seat and surface are substantially complementary.

11. A composite fluid nozzle according to claim 1 wherein said seat and surface are annular.

12. A composite fluid nozzle according to claim 1 wherein said discharge tip member projects beyond said body member.

13. A composite fluid nozzle according to claim 1 wherein said body member and discharge tip member are dissimilar in composition.

14. A composite fluid nozzle according to claim 1 wherein said discharge tip member is harder than said body member.

15. A composite fluid nozzle according to claim 1 wherein said discharge tip member and body member possess dissimilar physical properties.

16. A composite fluid nozzle according to claim 1 wherein said body member is composed of a plurality of parts beam welded together.

17. A composite fluid nozzle according to claim 1 wherein said discharge tip member is composed of a ceramic material.

18. A composite fluid nozzle according to claim 1 wherein an electron beam weld joins said tip and body members.

19. A composite fluid nozzle according to claim 1 wherein at least one of said members has a portion composed of ceramic material.

References Cited

UNITED STATES PATENTS

| | | | |
|---|---|---|---|
| 1,393,562 | 10/1921 | Matthews. | |
| 2,286,658 | 6/1942 | Voit | 239—533 X |
| 2,860,010 | 11/1958 | Sennstrom et al. | 239—600 X |
| 2,862,828 | 12/1958 | Glaser | 239—602 X |
| 2,874,000 | 2/1959 | Nystrom. | |
| 3,069,099 | 12/1962 | Graham | 239—533 X |
| 3,131,779 | 5/1964 | Rowley et al. | 239—602 X |
| 3,301,993 | 1/1967 | Bowd et al. | 219—121 |
| 3,302,882 | 2/1967 | Hutton | 239—602 X |
| 3,230,339 | 1/1966 | Opitz et al. | 219—121 |

FOREIGN PATENTS

| | | |
|---|---|---|
| 874,957 | 6/1942 | France. |
| 928,499 | 6/1955 | Germany. |

M. HENSON WOOD, Jr., *Primary Examiner.*

V. C. WILKS, *Assistant Examiner.*